Aug. 26, 1958  A. D. TURNBOW ET AL  2,849,161
FEED MEASURING AND DISPENSING DEVICE
Filed Sept. 18, 1956  2 Sheets-Sheet 1
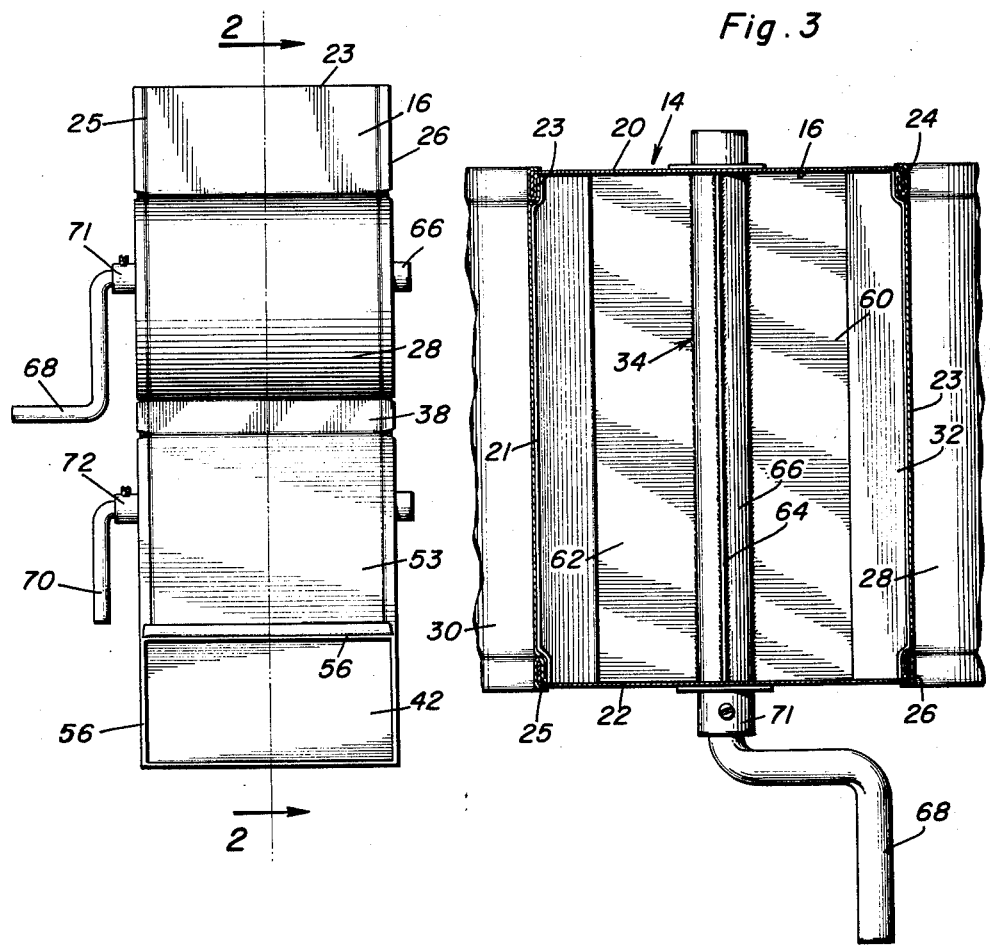
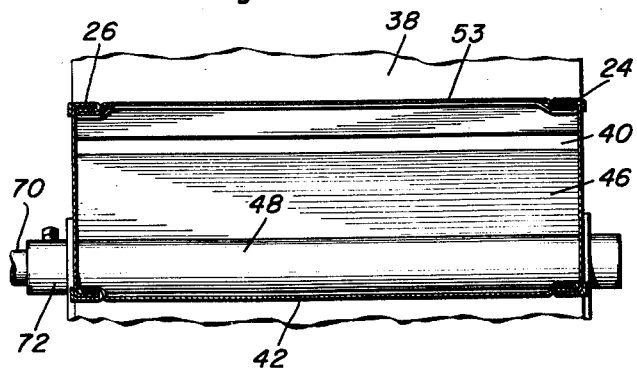
Amos D. Turnbow
Ralph B. Sesker
INVENTORS.

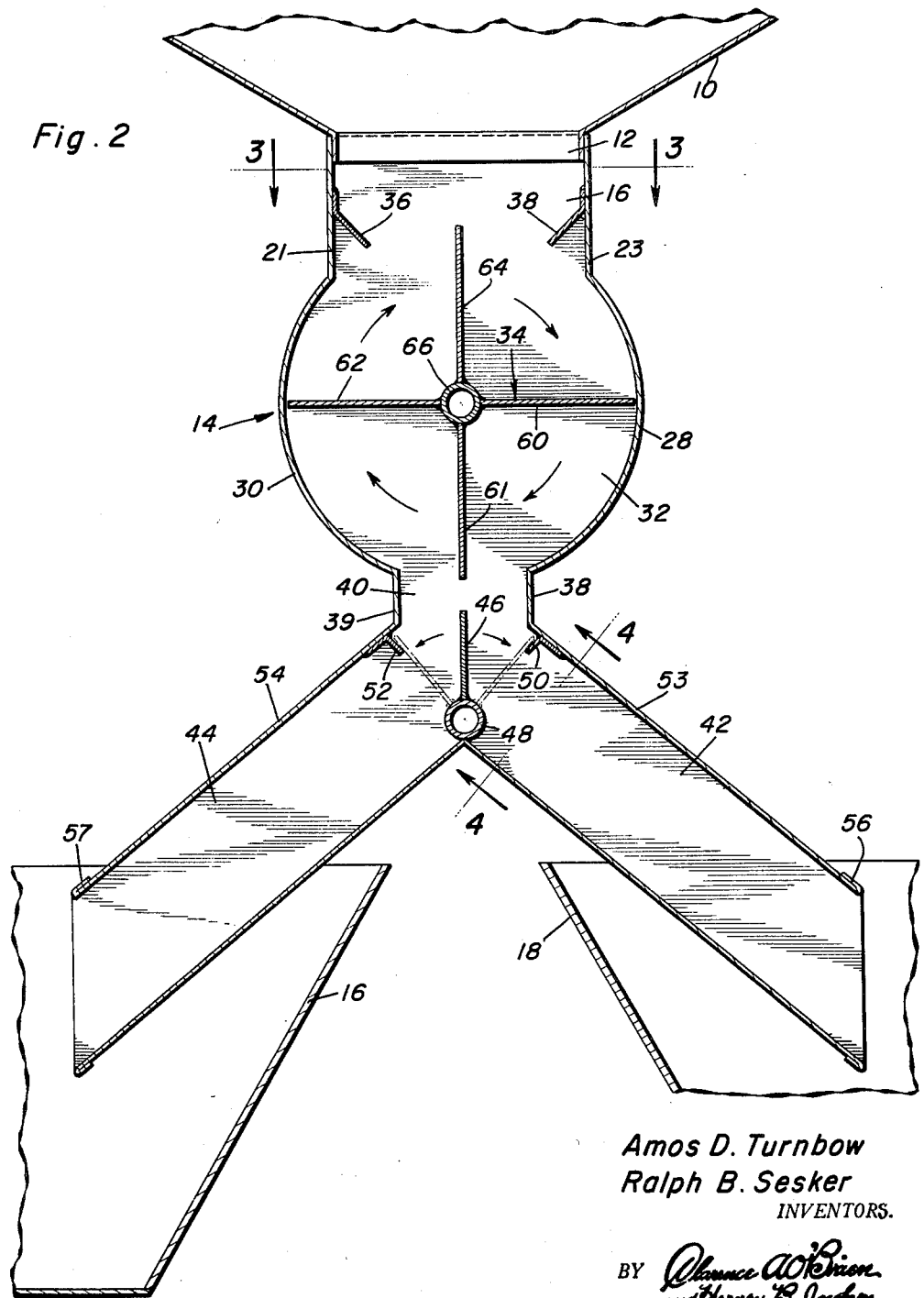

United States Patent Office 2,849,161
Patented Aug. 26, 1958

2,849,161

FEED MEASURING AND DISPENSING DEVICE

Amos D. Turnbow and Ralph B. Sesker, Ontario, Oreg.

Application September 18, 1956, Serial No. 610,479

1 Claim. (Cl. 222—368)

This invention relates to feed measuring and dispensing devices.

An object of the present invention is to provide a feed measuring and dispensing device that is primarily, although not exclusively, useful in the dispensing of feed to cows in a milking parlor. More particularly, an object of the invention in accordance with the above is to provide a dispensing and metering device for various feeds and particularly for use in a milk parlor whereby the accuracy of the charge of feed dispensed assists the farmer in the saving of feed and is an aid to the farmer in keeping the parlor in a neat, clean and orderly condition.

A more specific object of the present invention is to provide a feed metering and dispensing device which relies on the rotation of a dispensing wheel for delivering a specific quantity of feed from a hopper into a selected one of a plurality of chutes that lead to feeders from which the cows or other animals may feed.

It is important that devices of this nature be practical. In order to be practical, they must operate with reasonable certainty and with considerable ease without the necessity of various adjustments and alterations during the operation, after or preceding the operation by the farmer. Accordingly, it is a further object of the present invention to provide a feed metering and dispensing device which is of a practical nature.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of a device which is constructed in accordance with the invention;

Figure 2 is a longitudinal sectional view in enlarged scale and taken on the line 2—2 of Figure 1;

Figure 3 is a transverse sectional view taken on the line 3—3 of Figure 2; and

Figure 4 is an enlarged sectional view taken approximately on the line 4—4 of Figure 2.

In the accompanying drawings there is a feed metering and dispensing device which is constructed in accordance with the invention. This device is connected to an ordinary hopper 10 and more particularly to the discharge spout 12 thereof, the hopper and spout functioning to show that the device is adapted to be connected to a suitable source of grain or other feed. The device 14, which exemplifies the invention, is shown in connection with two feeding troughs 16' and 18 respectively as they would be found in a milking parlor. Accordingly, the principal, but not the exclusive field of use of the invention is illustrated in Figure 2.

The metering and dispensing device 14 is made of sheet metal or an analogous, lightweight, but strong material. It has an inlet 16 in registry with spout 12, as by being fitted thereover or therein. As shown in Figure 3, the inlet 16 is rectangular in cross-section, consisting of four walls 20, 21, 22 and 23 respectively, the edges of which are joined by Pittsburgh seams 23, 24, 25 and 26 respectively or by another type of sheet metal junction. Accordingly, the inlet is in the form of a tube. The two opposite walls 21 and 23 of the inlet have arcuate sections 28 and 30 which cooperate with parts of walls 20 and 22 in order to form chamber 32 in which the dispensing wheel 34 is operable. Baffles 36 and 38 are joined to the inner surfaces of the upper parts of walls 21 and 23, that is, in the inlet 16, in order to direct the flow of feed from hopper 10 into the central part of the chamber 32. The lower extremities of walls 21 and 23, that is, the parts of the walls below chamber 32, are straight, forming sections 38 and 39 which cooperate with other parts of the walls 20 and 22 in order to form the discharge throat 40 which receives feed from the dispensing wheel 34 and directs it into chute 42 or 44. Throat 40 functions as a chamber for valve 46 that is mounted for oscillation therein. This valve is a rectangular plate mounted for rotation on spindle 48 that passes through openings in the parts of walls 20 and 22 which function as parts of the chutes 42 and 44. The limit of travel of valve 46 in each direction is established by stops 50 and 52 respectively which are secured to the upper walls 53 and 54 of the chutes 42 and 44. The stops 50 and 52 are preferably, but not necessarily, formed of angle stock with one flange thereof being secured to walls 53 and 54 and the other flange functioning as a rest for the valve 46. When in one position, the valve completely closes chute 44 and permits all of the feed to pass through chute 42. When in the opposite position, all of the feed passes into chute 44, with chute 42 being closed. In the intermediate position, half of the grain will go into one chute, while the other half of the grain that is dispensed from the wheel 34 will go into the other chute and ultimately into its trough.

The chutes 42 and 44 are sufficiently long to discharge into the troughs 16' and 18. They are preferably rectangular in cross-section and have rolled ends 56 and 57 for strength and safety.

The dispensing wheel 34 is made of four radially arranged plates 60, 61, 62 and 64 which protrude from spindle 66. This spindle is mounted for rotation in openings in opposite walls 22 and 20. It has a crank handle 68 on one end thereof to facilitate the operation of it. Handle 70 is on the end of spindle 48 for a similar reason. The spindles are held in place in the device by similar expedients. There are collars 71 and 72, held by set screws onto the spindles 66 and 48 respectively and which bear against the outer surface of wall 22. This limits the axial movement of the spindles, while cotter keys, collars or similar expedients or devices are on the opposite ends of the spindles.

In order to operate the metering and dispensing device, the farmer merely turns the handle 70 in order to move the diverter valve 46 so as to divert the feed into the proper stall, that is, into either the trough 16 or 18 as schematically represented in Figure 2. The operator can fairly accurately judge the quantity of feed he wishes to dispense by knowing the quantity dispensed upon each complete turn of the crank handle 68. As handle 68 is rotated, the charge of feed that is confined between adjacent pairs of plates 60, 61, 62 and 64 is expressed into throat 40, thence into chute 42 or 44, or both.

The foregoing is considered as illustrative only of the principles of the invention. Further since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A combination measuring and dispensing device for feed, said device comprising a dispensing wheel chamber and an inlet, said inlet and chamber being formed by four walls of sheet material, two of said walls having arcuate sections which cooperate with sections of the other two of said walls to define a substantially cylindrical dispensing wheel chamber, a spindle rotatably supported in said chamber, an axial handle on said spindle emerging from said chamber and adapted to rotate said spindle, radial plates carried by said spindle terminating adjacent said arcuate wall sections, baffles in said inlet to direct the feed toward the center part of said chamber, a throat in said four walls downstream of said chamber and in registry with said chamber, a pair of spouts connected with said throat, means to divert the feed into a selected spout, said means comprising a flat valve, a valve spindle to which said flat valve is secured, one of said walls having an opening through which said valve spindle passes, a handle at the end of said valve spindle to rotate said spindle to thereby move said flat valve to selected positions in said throat, a pair of stops spaced from each other and secured to a wall of each chute, said stops being contacted by said flat valve in order to limit the extent of travel of said flat valve in opposite directions.

References Cited in the file of this patent

UNITED STATES PATENTS

| | | |
|---|---|---|
| 740,687 | O'Connor | Oct. 6, 1903 |
| 1,342,456 | Nagel | June 8, 1920 |
| 1,725,283 | Knittle | Aug. 20, 1929 |
| 2,190,111 | Zellers | Feb. 13, 1940 |
| 2,706,581 | Albers | Apr. 19, 1955 |